United States Patent

Garth

[15] 3,657,701

[45] Apr. 18, 1972

[54] DIGITAL DATA PROCESSING SYSTEM HAVING A SIGNAL DISTRIBUTION SYSTEM

[72] Inventor: Emory C. Garth, Austin, Tex.

[73] Assignee: Texas Instruments Incorporated, Dallas, Tex.

[22] Filed: Nov. 2, 1970

[21] Appl. No.: 86,014

[52] U.S. Cl...........................340/147 R, 317/101 CM, 333/6
[51] Int. Cl...........................H05k 1/04
[58] Field of Search..........................340/167, 147 P; 317/101 R, 317/101 CM; 333/8, 7, 6, 84

[56] References Cited

UNITED STATES PATENTS

| | | | |
|---|---|---|---|
| 3,237,164 | 2/1966 | Evans | 340/147 |
| 3,438,029 | 4/1969 | Fuchser et al. | 333/6 X |
| 3,519,959 | 7/1970 | Bewley et al. | 317/101 CM X |
| 3,568,000 | 2/1971 | D'Abouille | 317/101 CM |

*Primary Examiner*—Donald J. Yusko
*Attorney*—Harold Levine, James O. Dixon, Andrew M. Hassell, Melvin Sharp, Rene E. Grossman and James T. Comfort

[57] ABSTRACT

Logic signals are distributed to a plurality of logic cards in a digital computer. Each logic card taps into a motherboard transmission line with a conductor stub. Signal distribution on the motherboard is along a transmission line of a primary system impedance up to a first stub. At the first stub, signal distribution continues along a secondary impedance line of a suitable impedance such that signal discontinuities due to stubs and loads will be minimized. At a last stub signal distribution continues along a transmission line of the primary system impedance and is terminated in the primary impedance.

17 Claims, 5 Drawing Figures

INVENTOR
Emory C. Garth
BY J.T. [signature]
ATTORNEY

WITNESS [signature]

DIGITAL DATA PROCESSING SYSTEM HAVING A SIGNAL DISTRIBUTION SYSTEM

This invention relates to digital data processing systems and more particularly to the distribution of logic signals among the various logic cards within such a system.

Efficient signal distribution is a major problem in the design of a data processing system. In a typical computer a plurality of logic circuits are contained on each of a plurality of logic cards which are interconnected by means of transmission lines. It is common practice for a single logic signal to drive a plurality of logic circuits located on different logic cards, such as when the same signal is the set or reset signal for a plurality of flip-flops. One approach to this signal distribution problem is to use a separate transmission line to distribute the logic signal to each logic card. This approach creates practical problems because of the excessive number of transmission lines required. And each transmission line requires a separate driving source and separate termination, thus adding unwanted expense as well as volume. Another known approach consists of using a single transmission line that enters and exits each card in turn and is properly terminated after the last card. This latter approach requires an excessive number of connectors and delays signal propagation.

The present invention utilizes a plurality of motherboards each of which distributes signals to a plurality of logic cards, wherein said motherboards are master distribution boards each comprising a plurality of transmission lines. A plurality of stubs tap into a motherboard transmission line in order to distribute a logic signal to a plurality of logic cards. Signal distribution on a motherboard is along a transmission line of a primary system impedance up to the first stub, at which point distribution continues along a line of a suitable secondary impedance. Acceptable combinations of secondary impedance, stub spacing and stub length are dictated by acceptable signal discontinuity requirements.

A logic signal enters a motherboard through a connector and continues along a transmission line of the primary system impedance up to the first stub. From the first stub to the last stub the motherboard transmission line is of a suitable secondary impedance. To minimize signal discontinuities along the secondary line portion, a controlled degradation of a higher impedance line is employed according to the following equation:

$$Z=\frac{Z_{os}}{\sqrt{1+\frac{C_d}{C_{os}}}} \qquad (1)$$

where $Z$ is the resulting degraded impedance, $Z_{os}$ is the characteristic impedance of the secondary line, $C_{os}$ is the secondary line capacitance per unit length, and $C_d$ is the added distributed capacitance per unit length (of secondary line) resulting from the stubs and respective logic card loads. Acceptable values of $Z$ are determined according to the following equation:

$$\rho = Z - Z_{op}/(Z+Z_{op}) \qquad (2)$$

where $\rho$ is the signal reflection coefficient and $Z_{op}$ is the primary system impedance.

Accordingly, it is an object of the present invention to provide a new distribution system for logic signals within a digital computer system.

A further object of the invention is to provide a logic signal distribution system for a digital computer wherein signal discontinuities are minimized.

The foregoing and other objects, features and advantages of the invention will become more apparent from the following detailed description in conjunction with the accompanying drawings in which.

Figure 1:
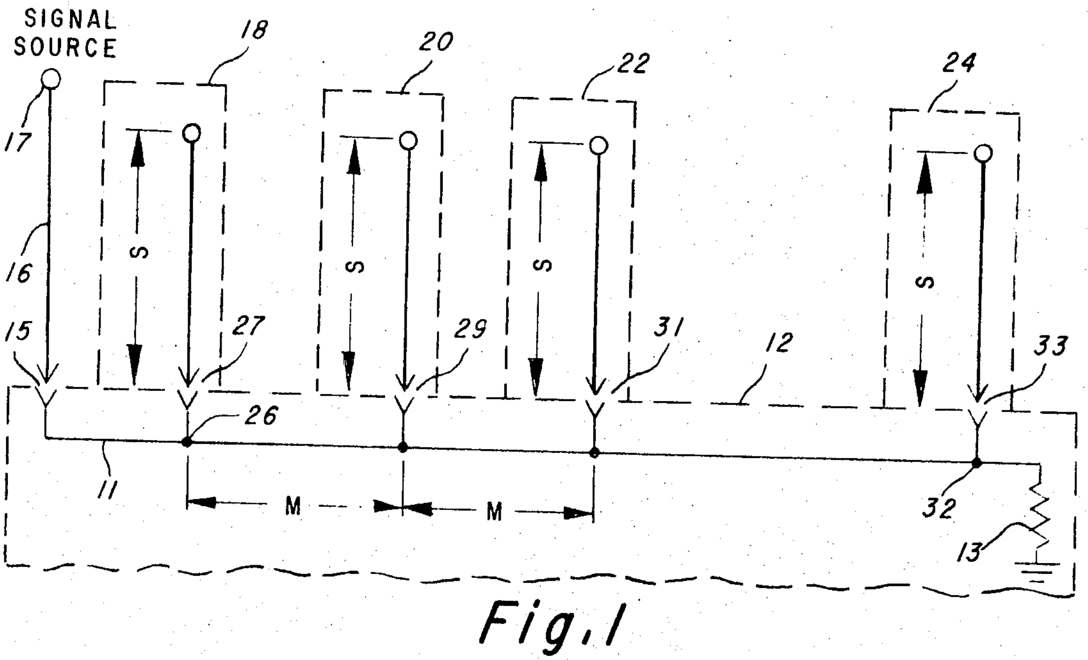
FIG. 1 is a schematic diagram illustrating the invention.

Referring now to FIG. 1, a schematic diagram illustrating the present invention is shown. A logic signal 16 originating at source 17, which may be located anywhere in the system, enters motherboard 12 through connector 15. From connector 15 logic signal 16 is distributed along motherboard 12 by means of transmission line 11 and is finally terminated in resistor 13, which is of the primary system impedance. From connector 15 to first stub location 26, transmission line 11 is of the primary system impedance. From first stub location 26 to last stub location 32 transmission line 11 is of a secondary impedance which is normally higher than the primary system impedance. From last stub location 32 to termination resistor 13 transmission line 11 is again of the primary system impedance.

Logic cards 18, 20, 22 and 24 are shown tapped into transmission 11 on motherboard 12 through respective connectors 27, 29, 31 and 33. On each logic card the logic signal is carried to a load by a transmission line of a suitable capacitance per unit length, such transmission lines being of some length S not necessarily the same for all such lines. For the purpose of this illustration the transmission line segments connecting the motherboard transmission line 11 to the various logic card connectors are assumed to be of negligible length. The distance between stub locations is labeled M, although the stubs are not required to be spaced equally apart.

FIG. 1 illustrates the arrangement of the component parts of the present invention. In a typical application one would normally begin with an acceptable range of values for reflection coefficient $\rho$, typically on the order of ±10%, in order to determine compatible combinations of stub spacing M and stub length S. For example, from the acceptable range for $\rho$ and the known value of primary system impedance $Z_{op}$, a corresponding range of values of degraded secondary impedance Z would be obtained using Equation 2. Then using Equation 1 and the known values of original secondary line impedance $Z_{os}$ and capacitance per unit length $C_{os}$, a corresponding range of values for $C_d$ would be obtained. The added distributed capacitance at each stub location due to the stubs and loads is distributed uniformly over a segment of the secondary transmission line equal to the stub spacing M. The load capacitance is approximately equal to the input capacitance of the first logic circuit on the logic card, and is thus a fixed value. The capacitance due to the stub is equal to the stub length S times the stub line capacitance per unit length. Therefore, as the added distributed capacitance $C_d$ is assumed to be equal to the lumped capacitance due to a stub and load distributed over a secondary line segment of length equal to stub spacing M, a tradeoff exists between stub spacing M and stub length S. For a selected value of stub spacing M a range of acceptable values of stub length S can be determined, or vice versa. Within the above limitations a convenient combination of stub lengths and stub spacings can be selected.

The preceding discussion can be more fully understood with reference to the following tables:

TABLE I

| Stub Length | Stub Spacing Minimum | Stub Spacing Maximum |
|---|---|---|
| 1.0 in. | 0.53 in. | 1.56 in. |
| 1.5 | 0.64 in. | 1.86 in. |
| 2.0 | 0.74 in. | 2.15 in. |
| 2.5 | 0.84 in. | 2.45 in. |
| 3.0 | 0.94 in. | 2.74 in. |
| 3.5 | 1.04 in. | 3.04 in. |

TABLE II

| Stub Spacing | Stub Length Minimum | Stub Length Maximum |
|---|---|---|
| 1.0 in. | 0.045 in. | 3.30 in. |
| 1.5 | 0.89 in. | 5.77 in. |
| 2.0 | 1.74 in. | 8.25 in. |
| 2.5 | 2.59 in. | 10.72 in. |
| 3.0 | 3.43 in. | 13.20 in. |

Table I lists minimum and maximum values of stub spacing for selected stub lengths in a representative embodiment of the invention. For the system of Table I the primary system impedance is selected as 40 ohms. The initial segment of the motherboard line is of characteristic impedance $Z_{op}$ of 40 ohms, and corresponding capacitance per unit length $C_{op}$ of 4.5 picofarads per inch. The secondary portion of the motherboard line, which is the portion to which the stubs attach, and the stub lines are of characteristic impedance $Z_{os}$ of 80 ohms and corresponding capacitance per unit length of 2.25 picofarads per inch. It is assumed that a reflection coefficient of ±10% is compatible with system requirements. It is also assumed that the logic card circuits have a representative input capacitance of 3.7 picofarads.

In accordance with the preceding discussion, the values listed in Table I are derived in the following manner. Equation 2 is utilized to determine an acceptable range for degraded secondary impedance Z. Then Equation 1 is used to derive the acceptable range for $C_d$, the added distributive capacitance per unit length of secondary line. Since the value of circuit input capacitance is fixed, the total lumped capacitance at each stub location is dependent on the stub length. This lumped capacitance is assumed to be distributed uniformly over a secondary line portion of length equal to the stub spacing, resulting in a tradeoff between stub spacing and stub length. Table I is derived by selecting values of stub length and calculating the allowable range for stub spacing. For instance, stubs 1 inch long must be spaced at least 0.53 inches apart but not more than 1.56 inches apart, in order to minimize signal discontinuities. Table II is for the same system of Table I, but the values in Table II are derived by selecting the stub spacing and calculating the allowable range for stub lengths.

Figures 2, 3A:
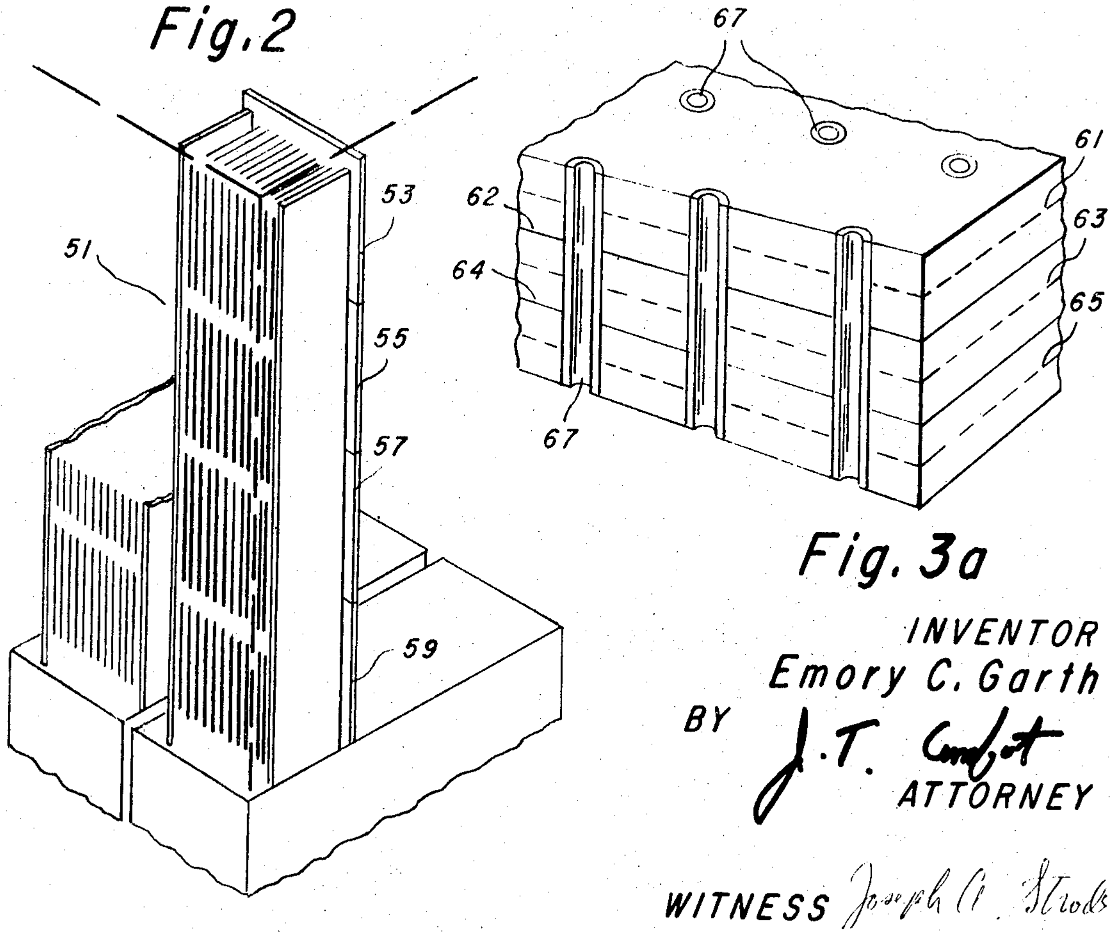
FIG. 2 is a view of a logic cabinet comprising four motherboards each distributing signals to a plurality of logic cards.
FIG. 3a is a section view illustrating the construction of the logic cards and motherboards employed in the preferred embodiment.

In the preferred embodiment of the invention a signal distribution board called a motherboard is utilized to distribute logic signals to a plurality of logic cards. This arrangement is illustrated in FIG. 2, which shows a logic cabinet 51 with four motherboards 53, 55, 57 and 59 and a plurality of logic cards connected to each motherboard within cabinet 51. A typical digital computer would contain therein a plurality of such logic cabinets. Each motherboard forms a panel on one side of the logic cabinet. The side of the motherboard facing inside the cabinet has connectors mounted thereon into which the logic cards are plugged.

Referring now to FIG. 3*a*, a section view of a motherboard is shown which illustrates the manner in which the motherboard is constructed. The illustrated motherboard is comprised of three signal planes 61, 63 and 65 and two voltage planes 62 and 64. The motherboard is preferably constructed of epoxy-glass, with the signal transmission lines and voltage distribution lines being copper strip-line etch. A plurality of metal feed-throughs, or plated holes, 67 extend through the motherboard as shown. The appropriate feed-throughs are connected at various ones of the signal and voltage planes, as is illustrated in FIG. 3.

Figure 3:
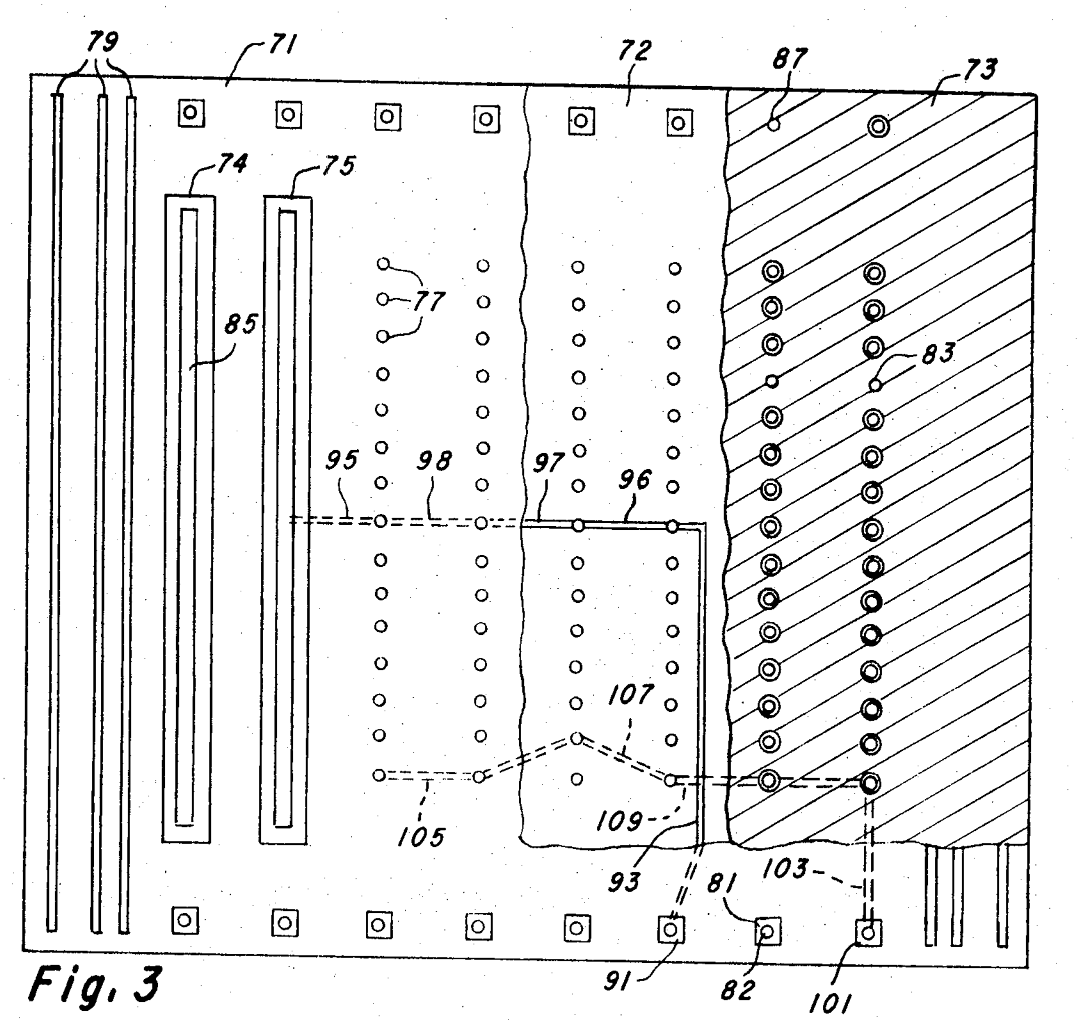
FIG. 3 illustrates the construction and function of the motherboards employed in the preferred embodiment of the invention.

Referring to FIG. 3, the surface (partially cut away) of the motherboard which faces internal to a logic cabinet is shown. The motherboard shown is designed for eight logic cards. Segment 71 of the motherboard shows the top surface thereof, with connectors 74 and 75 mounted thereon. The connectors have circular pins extending from the bottom and are mounted by plugging them into the plated holes. The row of plated holes 77 illustrates that this motherboard is designed for a 15 pin connector. Segment 72 of the motherboard shows the top layer of epoxy-glass removed to expose signal plane 61 of FIG. 3*a*; segment 73 illustrates the top two layers removed to expose voltage layer 62. The exposed surface at segment 72 is epoxy, with copper etch connecting appropriate plated holes. The exposed surface at segment 73 is a thin copper plane which has been etched away around the plated holes to provide insulation therefrom.

Signals and source voltages enter and exit the motherboard by means of a plurality of solder pads located at each end of the motherboard. Each solder pad is connected to a plated hole which extends through the board. Copper etch transmission lines located at the signal planes distribute the signals from the plated holes to the appropriate connector pin plated holes. A short length of coax cable is used to connect the appropriate solder pads on adjoining motherboards. On each side of the motherboard is provided a plurality of transmission lines 79 which provide ready capability to bypass one motherboard enroute to another.

Source voltage distribution is illustrated with respect to segment 73 which exposes voltage layer 62. The source voltage from an adjoining motherboard enters at solder pad 81 and is connected to the copper etch sheet at voltage layer 62 by the plated hole 82. The row of plated holes extending from 83 to 85 are all connected to the copper sheet. Thus the connector pins, one for each logic card, which plug into these holes distribute the source voltage to the respective logic cards. At the top of the motherboard plated hole 87 is used to transmit the voltage to the next motherboard by a coax cable. All other plated holes on the motherboard are insulated from the voltage plane sheet by means of a narrow band of exposed epoxy. It should be apparent that the number of voltage layers required in the motherboard will be dependent upon the number of different source voltages utilized in the system, although the present example is described with respect to two such source voltages.

In accordance with the present invention, a logic signal enters the motherboard of FIG. 3 at solder pad 91 and is distributed to a first logic card by a transmission line 93 of the primary system impedance. The signal under consideration is distributed to four logic cards with termination being provided on the fifth logic card to which it connects. Therefore, transmission line segment 95 is also of the primary system impedance. The transmission line segments 96, 97 and 98 are each of a secondary impedance and the length of these segments is the stub spacing M previously described herein.

Distribution of the signal which enters at solder pad 101 occurs at a signal plane which is not exposed, such as signal plane 63 or signal plane 65 of FIG. 3a. In accordance with the principles already stated, transmission line segments 103 and 105 are of the primary system impedance, with the remaining segments being of a secondary impedance. A comparison of transmission line segments 107 and 109 illustrates that the stub spacing M need not be the same distance for each successive logic card. Observing that transmission line segments 93 and 109 cross each other further illustrates the advantages of employing a multilayer construction for the motherboard.

Figure 4:
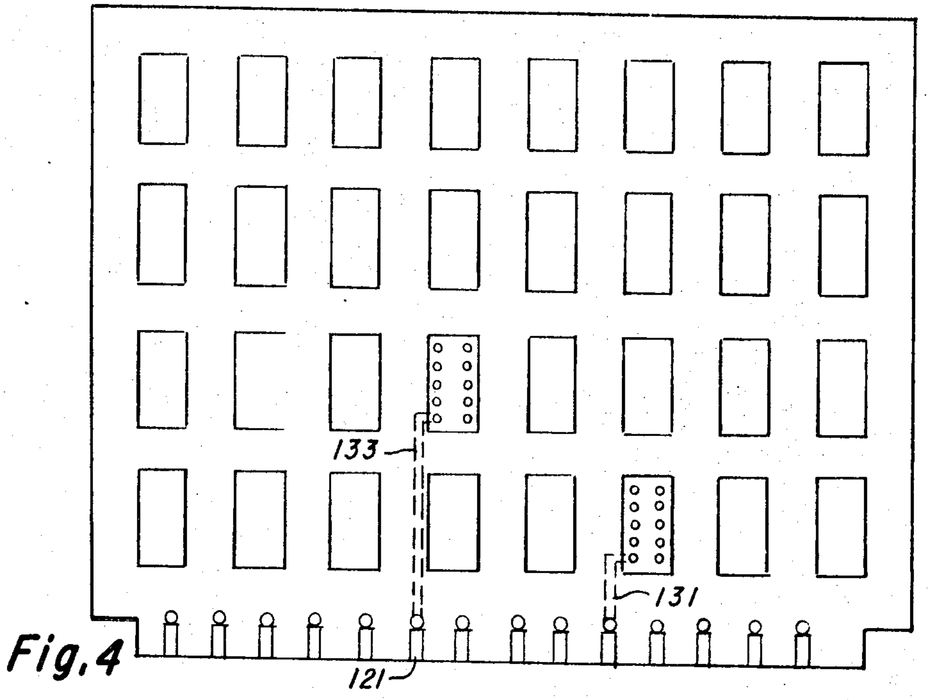
FIG. 4 is a view of a logic card employed in the preferred embodiment.

A top view of a typical logic card is shown in FIG. 4. Each logic card is of the multilayer construction shown in FIG. 3a. The logic card of FIG. 4 is designed for 32 logic circuits arranged in four rows and eight columns. It is assumed that the logic circuits are of the flat-pack construction with ten leads. Each circuit is mounted by soldering its leads directly into the plated holes. Each logic card plugs into a connector on the motherboard. A plurality of copper strips, such as 121, at the bottom of the logic card are in contact with the connector pins and thus with the plated holes in the motherboard when the logic card is plugged into a connector. Each of these copper strips is connected to a plated hole, thus providing for signal and voltage distribution as previously described. The advantage of employing multilayer circuit boards becomes apparent when one considers the vast number of interconnections that will occur among the logic circuits on each logic card.

In accordance with the present invention, a stub transmission line of some length S is employed on each logic card to distribute a logic signal from the motherboard transmission line to a logic circuit on a logic card. Two such stub lines are shown in FIG. 4, stub lines 131 and 133. These stub lines may be of the primary impedance or of a secondary impedance (i.e., capacitance per unit length), depending upon the available stub spacing and stub length.

Many advantages of employing the present invention and more particularly of employing the described embodiment should now be apparent. Signal discontinuities are minimized by appropriately designing stub spacings and stub lengths. The use of multilayer circuit boards and motherboards having transmission lines embedded therein in conjunction with the invention enables compact construction and minimizes conventional wiring problems.

What is claimed is:

1. A digital data processing system, said digital data processing system having a primary impedance and a secondary impedance, and comprising:

a. a first conducting means of the primary impedance of said digital data processing system;
b. second conducting means of a secondary impedance connected to said first conducting means;
c. a plurality of logic cards each including thereon a conducting means and one or more logic circuits;
d. a plurality of connecting means for connecting said conducting means of said logic cards to said second conducting means; and
e. third conducting means of said primary impedance connected to said second conducting means and terminated in said primary impedance.

2. The system of claim 1 wherein said conducting means on said logic cards is of said primary impedance.

3. The system of claim 1 wherein said conducting means on said logic cards is of said secondary impedance.

4. The system of claim 1 wherein said secondary impedance is higher than said primary impedance.

5. The system of claim 1 wherein said second conducting means and/or said conducting means on each of said logic cards are of predetermined length which is dependent upon system signal discontinuity requirements.

6. A digital data processing system, said digital data processing system having a primary impedance and a secondary impedance, and comprising:

a. a plurality of signal distribution boards, each of said boards containing thereon one or more transmission lines each comprised as follows:
   1. a first conducting means of the primary impedance of said digital data processing system;
   2. a second conducting means of a secondary impedance;
   3. a third conducting means of the primary impedance of said digital data processing system; and
   4. a termination means for terminating said transmission line;
b. a plurality of logic cards each comprised as follows:
   1. a conducting means of a secondary impedance; and
   2. one or more logic circuits; and
c. a plurality of connecting means for connecting said conducting means of said logic cards to said second conducting means of said signal distribution boards.

7. The system of claim 6 wherein said second conducting means and/or said conducting means on each of said logic cards are of predetermined length which is dependent upon system signal discontinuity requirements.

8. The system of claim 7 wherein said conducting means on said logic cards is of said primary impedance.

9. The system of claim 7 wherein said termination means is provided on said logic cards.

10. The system of claim 7 wherein said signal distribution boards are multilayer circuit boards.

11. The system of claim 10 wherein said multilayer circuit boards are comprised of alternate signal and voltage planes.

12. The system of claim 10 wherein said signal distribution boards contain plated holes into which connectors plug, into which said logic cards plug.

13. The system of claim 12 wherein said logic cards are multilayer circuit boards.

14. The system of claim 13 wherein said multilayer circuit boards are comprised of alternate signal and voltage planes.

15. The system of claim 13 wherein the leads on said logic circuits are soldered into plated holes in said logic cards.

16. A method of distributing a logic signal to a plurality of logic cards within a digital processing system, comprising:

a. transmitting said logic signal over a transmission line of the primary impedance of said digital processing system;
b. then transmitting said logic signal over a transmission line of a secondary impedance;
c. tapping into said secondary impedance transmission line at spaced intervals and transmitting the signal received thereby over a length of transmission line to logic cards; and
d. terminating said secondary impedance transmission line in said primary impedance.

17. The method of claim 16 wherein said spaced intervals and said length of transmission line are dependently determined in order to minimize signal discontinuities.

* * * * *